United States Patent
Ngo Ngoc et al.

(10) Patent No.: US 10,354,453 B2
(45) Date of Patent: Jul. 16, 2019

(54) COMPUTER-IMPLEMENTED METHOD FOR POSITIONING PATTERNS AROUND AN AVATAR

(71) Applicant: Dassault Systemes, Velizy Villacoublay (FR)

(72) Inventors: Cyril Ngo Ngoc, Asnieres-sur-Seine (FR); Auxkin Ortuzar Del Castillo, Saint-Cloud (FR); Denis Nouais, Clamart (FR); Everton Hermann, Montrouge (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 15/628,110

(22) Filed: Jun. 20, 2017

(65) Prior Publication Data
US 2018/0012420 A1    Jan. 11, 2018

(30) Foreign Application Priority Data
Jul. 8, 2016  (EP) .................................... 16305861

(51) Int. Cl.
*G06F 17/50* (2006.01)
*G06T 19/20* (2011.01)
(Continued)

(52) U.S. Cl.
CPC ............ *G06T 19/20* (2013.01); *G06F 17/50* (2013.01); *G06T 19/00* (2013.01);
(Continued)

(58) Field of Classification Search
None
See application file for complete search history.

(56) References Cited

U.S. PATENT DOCUMENTS 6,310,627 B1 * 10/2001 Sakaguchi ............. A41H 3/007
 345/630
6,968,297 B1 * 11/2005 Ziakovic ................ A41H 3/007
 345/419

OTHER PUBLICATIONS

"Pattern Design Software and 3D Sampling of Industrial Clothing", downloaded @https://www.youtube.com/watch?v=T9hEsa3JD-M, published on Jul. 28, 2015 (Year: 2015).*

(Continued)

*Primary Examiner* — Yingchun He
(74) *Attorney, Agent, or Firm* — Hamilton, Brook, Smith & Reynolds, P.C.

(57) ABSTRACT

A computer-implemented method for designing a virtual garment or upholstery (G) in a three-dimensional scene comprising the steps of: a) providing a three-dimensional avatar (AV) in the three-dimensional scene; b) providing at least one pattern (P) of said virtual garment or upholstery in the three-dimensional scene; c) determining a distance field from a surface of the avatar; d) positioning the pattern relative to the avatar by keeping a fixed orientation with respect to said distance field; and e) assembling the positioned pattern or patterns around the avatar to form said virtual garment or upholstery, and draping it onto the avatar. A computer program product, non-volatile computer-readable data-storage medium and Computer Aided Design system for carrying out such a method. Application of the method to the manufacturing of a garment or upholstery.

13 Claims, 10 Drawing Sheets

(51) Int. Cl.
 *G06T 13/40* (2011.01)
 *G06T 19/00* (2011.01)
(52) U.S. Cl.
 CPC .......... *G06F 2217/32* (2013.01); *G06T 13/40* (2013.01); *G06T 2200/24* (2013.01); *G06T 2210/16* (2013.01); *G06T 2219/2004* (2013.01); *G06T 2219/2016* (2013.01)

(56) References Cited

OTHER PUBLICATIONS

Extended European Search Report from European Application No. 16305861.3, entitled: "Computer-Implemented Method for Positioning Patterns Around an Avatar," dated Dec. 21, 2016.
Pascal Volino, Frederic Cordier, Nadia Magnenat-Thalmann, "From early virtual garment simulation to interactive fashion design," CAD Methods in Garment Design, No. 6 Mar. 2005 (Mar. 2005) pp. 593-608, XP37, Retreived from the Internet: URL:http://www.sciencedirect.com/science/article/pii/S0010448504002209 [retrieved on Dec. 13, 2016].
Arnulph Fuhrmann, Clemens Gross, Volker Luckasa, Andreas Weberb "Interaction-free dressing of virtual humans," Computers & Graphics vol. 27, pp. 71-82 (2003).
Hyewon Seo and Nadia Magnenat-Thalman "An automatic modeling of human bodies from sizing parameters," Proceedings of the 2003 Symposium on Interactive 3D graphics.
Brett Allen, Brian Curless, B. Buxton and P. Treleaven "The space of human body shapes: reconstruction and parametrization from range scans" Transaction on graphics ACM, Siggraph (2003).
Clemens Groß, Arnulph Fuhrmann and Volker Luckas "Automatic pre-positioning of virtual clothing" Proceedings of the 19th spring conference on Computer graphics. ACM (2003).
Le Thanh, Tung, and André Gagalowicz. "Virtual garment pre-positioning." Computer Analysis of Images and Patterns. Springer Berlin Heidelberg (2005).

\* cited by examiner

COMPUTER-IMPLEMENTED METHOD FOR POSITIONING PATTERNS AROUND AN AVATAR

RELATED APPLICATION(S)

This application claims priority under 35 U.S.C. § 119 or 365 to Europe, Application No. 16305861.3, filed Jul. 8, 2016. The entire teachings of the above application(s) are incorporated herein by reference.

FIELD OF THE INVENTION

The invention relates to the field of computer-aided design. More particularly, it concerns a computer-implemented method for designing a virtual garment or furniture upholstery comprising one or more two-dimensional (2D) patterns. Even more particularly, it aims at easing a step of such a method consisting in positioning said patterns around an avatar before assembling them by sewing their edges together.

The invention also concerns a computer-aided design system, computer program product and a non-volatile computer-readable data-storage medium containing computer-executable instructions to cause a computer system to carry out such a method, as well as a method of manufacturing a real garment or upholstery.

The invention applies to the clothing industry for the design of real garments and to the furniture industry for the design of real upholstery, but also to video games, animated movies etc. In general any domain where it's necessary to design realistic clothing on a computer in three dimensions (3D), be it for integration to a virtual world or for manufacture.

BACKGROUND

In the following, the word "avatar" will be used broadly to designate a computer-generated, usually three-dimensional, representation of a human or animal body, a humanoid or zoomorphic creature, or even a vegetable or an inanimate object (e.g. a piece of furniture such as a sofa). Most often, however, the avatar will be a representation of a human or humanoid body. The avatar may be designed ab initio, or it may be reconstructed by scanning a real body or object.

The words "virtual garment" or "virtual upholstery" will refer to a computer-generated bi-dimensional or (most often) three-dimensional representation of clothing, upholstery or the like, suitable to be worn by an avatar. The virtual garment may be a model of a "real" garment suitable to be manufactured in the physical world. In the following, only the case of garments will be discussed, but all equally applies to upholstery.

Avatars and virtual garments are preferably "three-dimensional" (3D). Hereafter, a "three-dimensional" object will be an object—or a digital model thereof—allowing a three-dimensional representation, which allows the viewing of its parts from all angles.

The word "pattern" will designate a piece of fabric, leather or other flexible material suitable to be used to manufacture a garment. A garment is most often manufactured by assembling several patterns by their edges. Patterns are usually considered two-dimensional, as they are developable (they can lie flat on a plane) and their thickness is negligible (smaller by at least two orders of magnitude) over their other dimensions.

Computer-aided techniques have been widely used in the development process of pattern-making in the fashion industry. Specifically, CAD (Computer Aided Design) and CAM (Computer Aided Manufacturing) systems have helped to produce digital 2D patterns which are then used to manufacture garments. These patterns are generally described as two-dimensional boundary curves enriched with additional information needed to physically construct the final garment. Several CAD systems exist on the market from companies such as Lectra, Gerber Technology, Optitex, Assyst GMbH (Human Solutions Group), Clo3D (Marvelous Designer). The modules they propose present common characteristics and are mainly focused on 2D patterns development, CAD-CAM management and manufacturing (e.g. pattern layout and cut with automatic machine).

With the emergence of 3D, virtual clothing is becoming a standard and it requires new techniques to assemble virtually the 2D patterns in order to get the virtual garment. Unfortunately, the 2D patterns created with standard CAD systems lack information about how to place them efficiently. In fact, most of the existing 2D CAD pattern models are conceived for design or cutting of unassembled textile parts. Thus, they do not provide assembly and positioning instruction in order to place them related to the model body.

Figure 1:
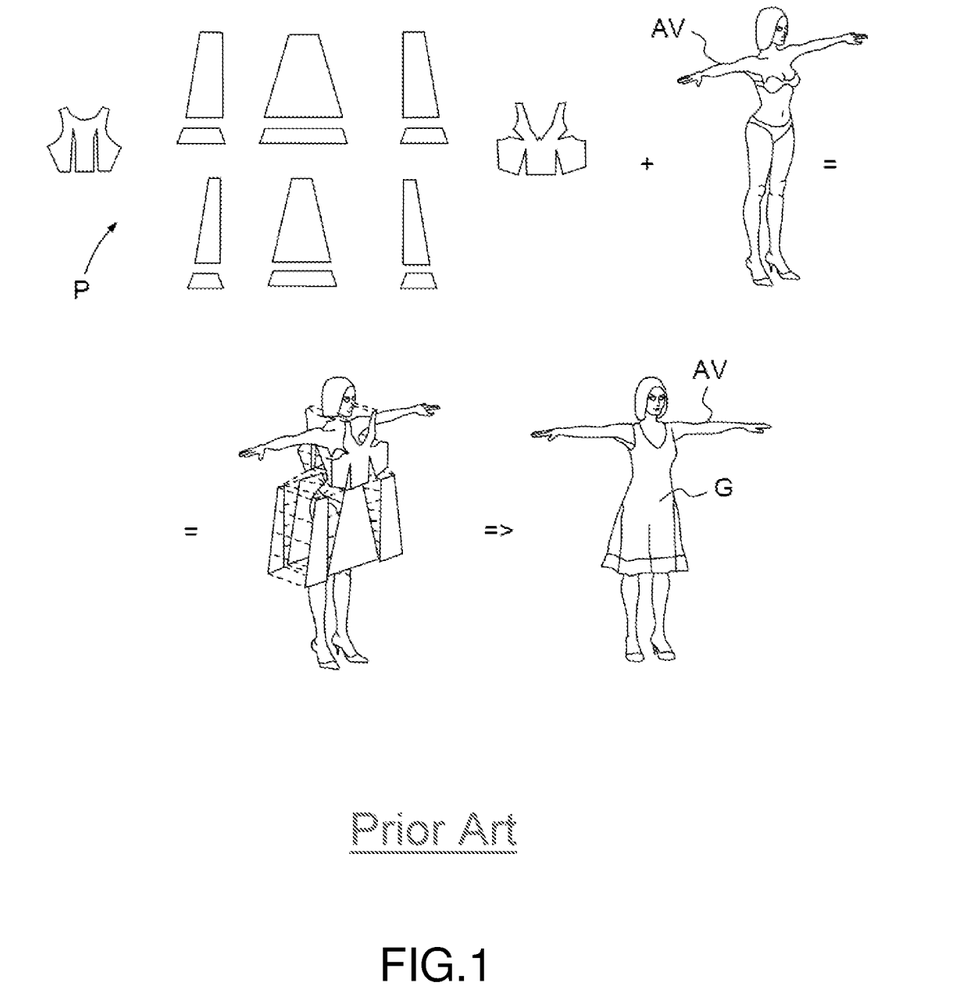
FIG. 1 illustrates the prior art.

FIG. 1 shows the general pipeline of a 3D virtual garment prototyping method. More details are provided in [1].

First of all, a set of 2D patterns P of the virtual garment and an avatar AV are provided. As it has been already mentioned, 2D CAD patterns may come from standard industry pattern-marker software; in some cases, they may be obtained by scanning and digitally processing "physical" patterns made of paper. The 3D avatar is created by an artist, generated from anthropometrical survey analysis or obtained from body measurements (e.g. 3D scanning). Then the patterns are positioned around the avatar and assembled using seam definitions. Finally, physical simulation is performed to drape the assembled garment G.

Pattern positioning and seams definition are crucial since they define the starting state for the garment simulation; if they are not provided or not well defined, the simulation will fail. Manual positioning of the pattern is a tedious and time-consuming (and therefore expensive) task for the garment designer, who has to pick-up 2D patterns, to move them around a 3D space—i.e. with six degrees-of-freedom (three translational and three rotational) and often to change the observation point of the scene. For this reason, research works have been performed concerning the automatic or semi-automatic pre-positioning of patterns and proposed by some commercial software like Vidya from Human Solutions. However, their results are not entirely satisfactory.

The most common approach consists in laying the patterns over developable (e.g. cylindrical or frustoconical) bound surfaces encompassing different parts of the avatar (e.g. its limbs and trunk). See [1] and [4]. It is also known to use "snap points" on the avatar (or on the bound surfaces) in order to allow fast pre-positioning (see [4]). An inconvenience of these approaches is that bound surface and/or snap points have to be defined manually for each avatar. In practice, the garment designer is constrained to use a limited library of avatars for which these elements have been pre-defined. Moreover the positioning is quite approximate (bound surfaces oversimplifies the shape of the avatar), and manual fine-tuning of the pattern position is often required.

Reference [5] uses 2D silhouettes to assist in pattern positioning. This approach is basically two-dimensional and does not allow a 3D fitting of the pattern around the avatar.

SUMMARY

The invention aims at overcoming this drawbacks of the prior art and to provide an effective, quick and easy method of performing automatic or at least semi-automatic positioning of patterns of virtual garments around an avatar, thus avoiding, at least in part, the tedious and time-consuming manual positioning task.

An object of the present invention is a computer-implemented method for designing a virtual garment or upholstery in a three-dimensional scene comprising the steps of:

a) providing at least one pattern of said virtual garment or upholstery in the three-dimensional scene;

b) providing a three-dimensional avatar in the three-dimensional scene;

c) computing a distance field from a surface of the avatar;

d) positioning the pattern relative to the avatar by keeping a fixed orientation with respect to said distance field; and e) assembling the positioned pattern or patterns around the avatar to form said virtual garment or upholstery, and draping it onto the avatar.

According to particular embodiments of the method:

Said step d) may comprise the sub-steps of:

d1) pre-positioning the pattern relative to the avatar using a positioning device; and d3) automatically rotating the pattern so that a normal direction, or average normal direction, to said pattern is aligned to a normal direction, or average normal direction, to an iso-distance surface of said distance field.

Said step d) may also comprise the sub-step of:

d2) adjusting a distance of the pattern from the avatar using said or a different positioning device.

Said step d) may also comprise the sub-step of:

d4) moving the pattern on a iso-distance surface of said distance field using said or a different positioning device while keeping its normal direction, or average normal direction, aligned to the normal direction, or average normal direction, to said distance field.

The distance of the pattern from the avatar may be the distance between a reference point of the pattern and a nearest point of the avatar. Alternatively, it may be the minimal distance between a point of the pattern and a point of the avatar.

The normal direction to the iso-distance surface may be its normal direction at a point of said iso-distance surface which is nearest to the pattern or to a reference point thereof. Alternatively, the average normal direction to the iso-distance surface may be computed by averaging normal directions to different points of a reference area of the iso-distance surface.

The, or at least one, positioning device may be chosen among: a mouse, a keyboard, a touch screen and a trackball.

Another object of the invention is a computer program product, stored on a non-volatile computer-readable data-storage medium, comprising computer-executable instructions to cause a computer system to carry out such a method.

Another object of the invention is a non-volatile computer-readable data-storage medium containing computer-executable instructions to cause a computer system to carry out such a method.

Another object of the invention is a Computer Aided Design system comprising a processor coupled to a memory and a graphical user interface, the memory storing computer-executable instructions to cause the Computer Aided Design system to carry out such a method.

Another object of the invention is a method of manufacturing a garment or upholstery comprising a plurality of two-dimensional patterns assembled by their edges, the method comprising:

a step of designing said garment or upholstery, including a sub-step of defining seams between said patterns by a method as outlined above; and a step of physically manufacturing said garment or upholstery, including assembling said patterns by realizing said seams.

Yet another object of the invention is a garment or upholstery obtained by this method of manufacturing.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Additional features and advantages of the present invention will become apparent from the subsequent description, taken in conjunction with the accompanying drawings, wherein.

DETAILED DESCRIPTION

A description of example embodiments follows.

Figure 2A:
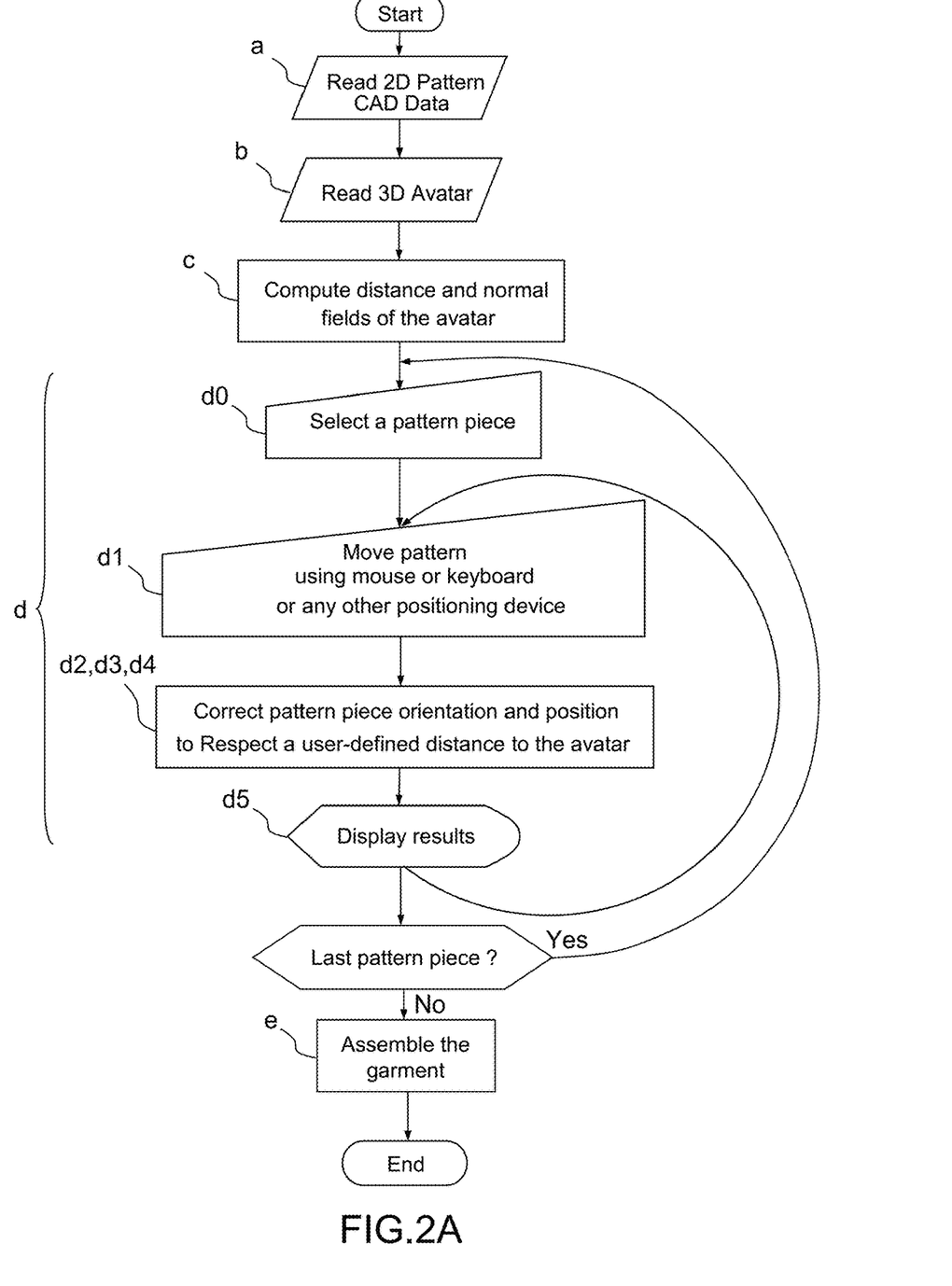
FIGS. 2A and 2B are flow-charts of methods according to different embodiments of the invention.

As illustrated on FIG. 2A, the first step "a" of a method according to an embodiment of the invention consists in reading (i.e. importing or downloading) CAD data corresponding to a set of two-dimensional patterns (reference P on FIGS. 1 and 3A-5I). Each patterns is specified by a polyline corresponding to the boundary and interior edges of the pattern, and by additional items of information defining styling elements such as darts, pleats, hemlines, iron lines, etc. As it will be discussed more in detail later, the specification of a pattern may also include a reference point and a normal direction to the pattern at said reference point.

The second step "b" of the method consists in reading a three-dimensional avatar (reference AV on FIGS. 1 and 3A-5I; FIGS. 3A to 4C represent sectional views of arbitrarily-shaped avatars, FIGS. 5A-5I elevation views of a human-shaped avatar) from a suitable database.

It will be understood that steps "a" and "b" can also be performed in reversed order, or simultaneously. It is even possible to directly sketch patterns in the virtual 3D space containing the avatar instead of reading them.

Steps "a" and "b" are carried out by a computer according to inputs provided by a user through suitable interface devices (typically a keyboard and/or a mouse).

Step "c" consists in computing a signed distance field of the avatar. This is a scalar field, wherein each point of the 3D virtual space containing the avatar is attributed a numerical value expressing its distance (in suitable units) from the nearest point of the surface of the avatar. The distance is negative for points situated inside the avatar, positive for those situated outside it. The distance field may be visualized with the help of iso-distance surfaces, constituted by points having a same distance from the avatar. Iso-distance lines, representing the intersection of iso-distance surface IDS with a plane, are illustrated on FIGS. 3A-5D. To avoid overcharging the figures, an iso-distance surface will only be represented by a single iso-distance line.

A normal field may also be computed; the normal field is a vector field, wherein each point of the 3D virtual space containing the avatar is attributed a unit-length vector, called normal direction, perpendicular to the iso-distance surfaces passing by the point. Alternatively, normal directions may be computed only when required by the pattern positioning algorithm. Some normal directions are illustrated on FIGS. 3A-3C, 4A, 4B, 5B and identified by reference NDF.

Computing distance and normal field is a task which may be performed fully automatically by a computer, using conventional algorithms.

Step "d" consists in positioning at least one pattern in the virtual 3D space with respect to the avatar. It comprises several sub-steps:

First of all (d0), one of the patterns read at step "a" is selected by the user, e.g. using a mouse.

Then (d1) the selected pattern is pre-positioned in the virtual 3D space using a pointing device, i.e. any suitable input device such as a mouse, a trackball, a touch screen, a keyboard, etc. The pre-positioning may be performed e.g. by "drag-and-drop". The user may also input the numerical value of a desired distance between the pattern and the avatar.

The following sub-steps (d2, d3 and d4) constitute the core of the invention. They consist in:
precisely adjusting the distance between the pattern and the avatar (d2);
correcting the orientation of the pattern, taking into account the distance field computed at step c (d3);
moving the pattern while keeping constant its distance from the avatar and its orientation with respect to the distance field (d4).

These sub-steps are carried out automatically (d2, d3) or semi-automatically (d4) by the computer; they will be described in detail later.

Sub-step d5 consists in displaying the result of the following sub-steps, allowing iterations.

Step "e", executed after that all the pattern pieces have been positioned, consists in assembling the garment by sewing one or more pre-positioned patterns by their edges. This step may be performed by any method known from the prior art, see e.g. [1].

Sub-step d2, which is optional, consists in performing an automatic correction of the distance of the pattern from the avatar. For instance, the corrected distance may be equal to a numerical value entered by the user using e.g. a keyboard.

Sub-step d3 consists in performing an automatic correction of the orientation of the pattern with respect to the avatar, taking into account the distance/normal fields. More precisely, the pattern is rotated so that it is as parallel as possible with the surface of the avatar.

According to some embodiments of the invention, each pattern comprises a reference point (reference RP on FIGS. 3A-5B), and a normal direction NP to the pattern at the reference point RP is computed by the computer (no ad hoc computation is required if a normal field has been pre-computed). The pattern-avatar distance is then defined as the distance between the reference point of the pattern and the closest point of the avatar; it simply corresponds to the minimum value of the distance field over all the points of the pattern. The pattern is then rotated until the normal direction NP is aligned with the normal direction NDF to the iso-distance surface IDS to the avatar passing by the reference point. This is illustrated, for instance, on FIGS. 3A and 3B. On these figures, the normal directions NP and NDF are represented by vectors having opposite orientations, but this is only for the sake of clarity. In these embodiments, sub-step d2 is preferably carried out before sub-step d3.

According to other embodiments of the invention, no reference point is defined on the garment. In this case, the pattern-average distance is defined by the minimal distance between a point of the pattern and a point of the avatar, i.e. by the minimal value of the distance field value over the pattern. Moreover, an "average" normal direction to the pattern is computed and used to define its orientation (in many cases, however, patterns are planar and therefore their average normal direction coincides with the normal direction at any of their points). This average normal direction of the pattern is not aligned to the normal direction of an iso-distance surface at a particular point thereof, but to an "average" normal direction ANF (see FIGS. 4C and 5E), the average being over an area of an iso-distance surface. For instance, the iso-distance surface could be the one which passes by the point of the pattern which is closest to the avatar, and the area considered for computing the average direction is constituted by the portion of said iso-distance surface which lies within a predetermined radius from this point.

The average normal direction to a surface (iso-distance surface or pattern) is computed by considering a plurality of discrete points of the surface, determining the normal directions to the surface at said points, representing them by unit-length vectors, adding them and normalizing the resulting vector.

Figure 2B:
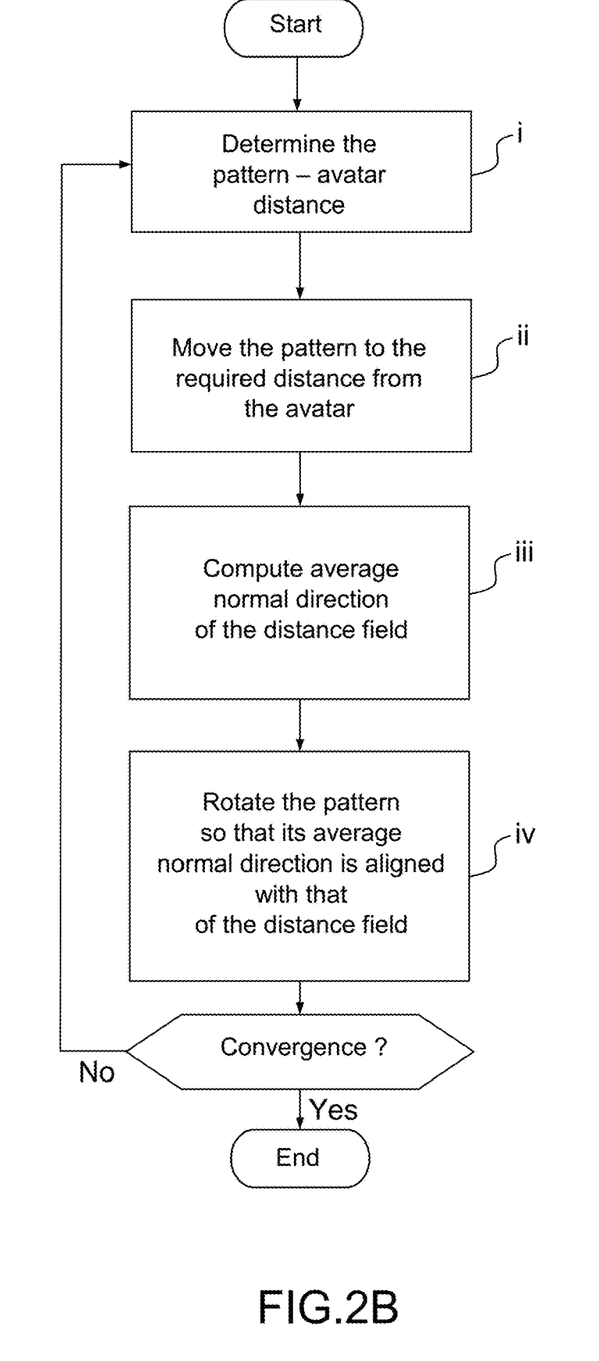

In these embodiments, sub-steps d2 and d3 are carried out iteratively, as illustrated on the flow-chart of FIG. 2B:

First of all (i), the computer determines—using the distance field—the distance between all the points of the pattern and the avatar.

Then (ii), the pattern is rigidly moved without changing its orientation in a reference frame of the 3D virtual space, until the nearest point to the avatar is at a preset distance from it.

Subsequently, an average normal direction of the distance field ANF is computed (iii)

and the pattern is rotated until its own average normal direction becomes parallel to ANF (iv). In general, this rotation modifies the pattern—avatar distance, therefore operations i-iv are iterated until convergence is reached. Convergence is considered to be reached when the pattern—avatar distance and/or the angle between the normal direction and the ANF and/or a combination thereof become lower than preset thresholds.

Yet other embodiments of the invention combine the use of a reference point on the pattern and of an average normal direction of the distance field.

Sub-step d4 consists in performing fine positioning of the pattern by moving it along an iso-distance surface, while keeping its normal direction (or average normal direction) aligned with that of the distance field. This sub-step is "semi-automatic" because the movement is performed according to inputs provided by the user, but the orientation of the pattern is automatically kept by the computer. The user may also alternate between moving the pattern along an iso-distance surface (d4) and changing the pattern-avatar distance, i.e. jumping from an iso-distance surface to another (d3). To do so, he may for instance use a mouse provided with a mouse-wheel: the wheel allows changing the distance, and the two-dimensional movement of the mouse determines that of the pattern on the iso-distance surface. An advantageous feature of the invention is that the iso-distance surface constrains the motion of the pattern, reducing the number of positional degrees of freedom which need being adjusted. More precisely, the user only has to act on the three translational degrees of freedom of the pattern, and possibly on a single rotational degree of freedom (rotation around the normal direction to the pattern), while the two remaining rotational degrees of freedom are automatically controlled by the computer as a function of the distance field.

Figure 3A:
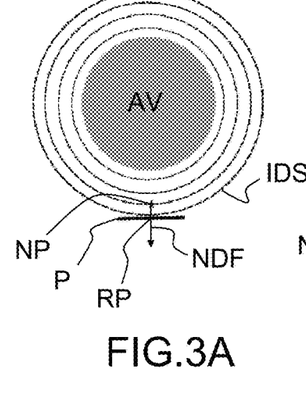
FIGS. 3A-3C, 4A-4C and 5A-5I illustrate different steps of a method according to the invention.
Figure 3B:
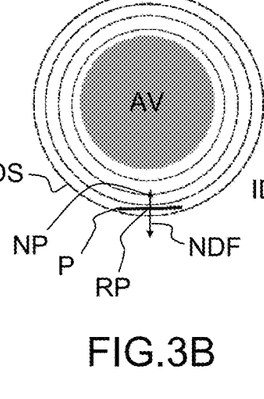
Figure 3C:
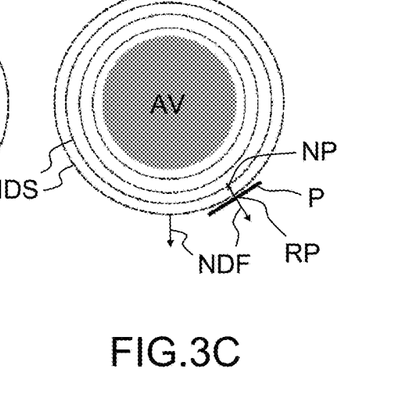

FIG. 3A shows a pattern P pre-positioned near an avatar AV, and whose orientation has been adjusted such that the normal direction NP to the pattern at a reference point RP thereof is aligned with the normal direction NDF to the iso-distance surface tangent to the pattern at the reference point; therefore the pattern is tangent to the iso-distance surface. FIG. 3B shows the same pattern, but closer to the avatar; its reference point lies on a different iso-distance surface. The change of distance is triggered by a user, e.g. by rotating a mouse wheel, as discussed above, or by entering a numerical value for said distance. The user may also move the pattern laterally, e.g. by performing a lateral movement with a mouse. or using "arrow" keys of a keyboard. As illustrated on FIG. 3C, the pattern then moves along the iso-distance surface while remaining tangent to it.

Figure 4A:
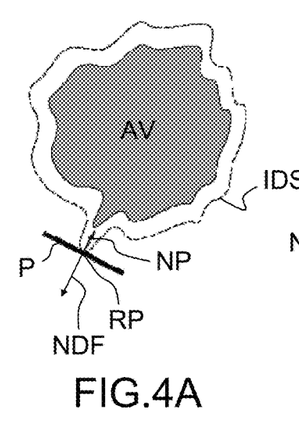
Figures 4B, 4C:
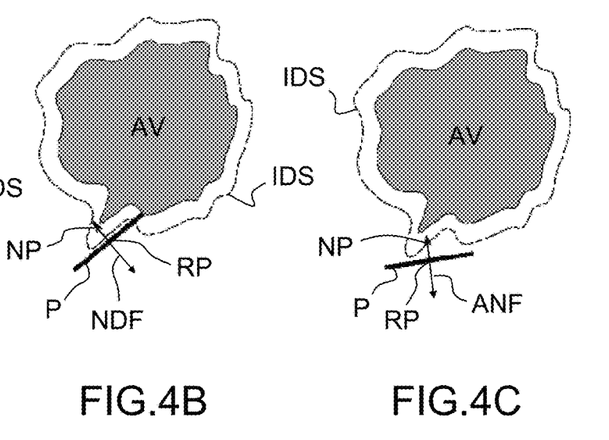

FIGS. 4A-4C illustrate why, in some cases, the use of an average normal direction ANF is advantageous. These figures relate to a case where the avatar AV has an irregular shape, with spikes and hollows. If the pattern P is pre-positioned directly in front of a spike (FIG. 4A), it may take an acceptable orientation. This orientation, however, may change dramatically and become clearly inappropriate (FIG. 4B) if the pattern is moved laterally. Use of an average normal direction ANF leads to more acceptable results (FIG. 4C).

While FIGS. 3A-4C are very simplified and only aimed at illustrating the basic principles of the invention, FIGS. 5A-5I relate to the positioning of a garment pattern P around a human-like avatar AV.

Figure 5A:
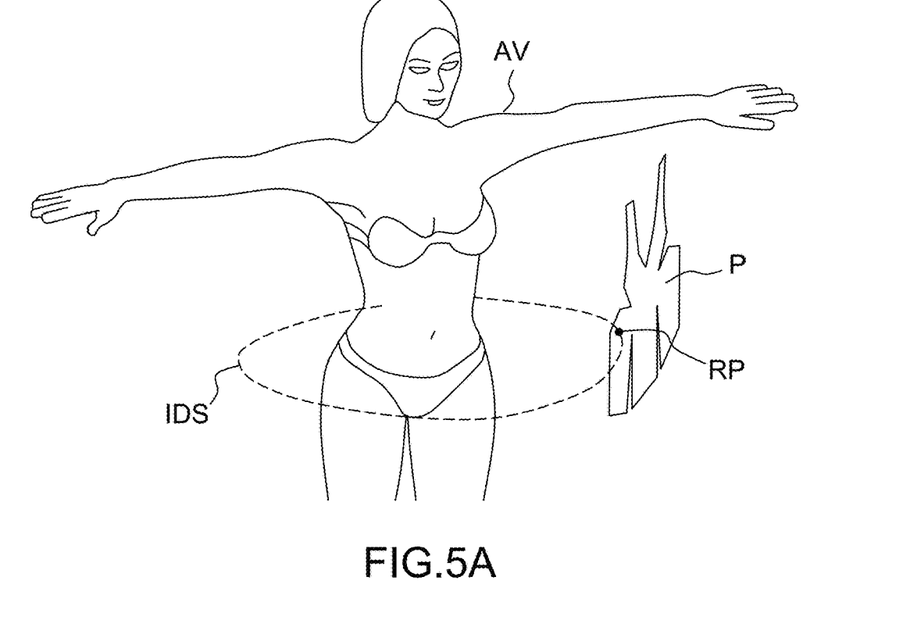
Figure 5B:
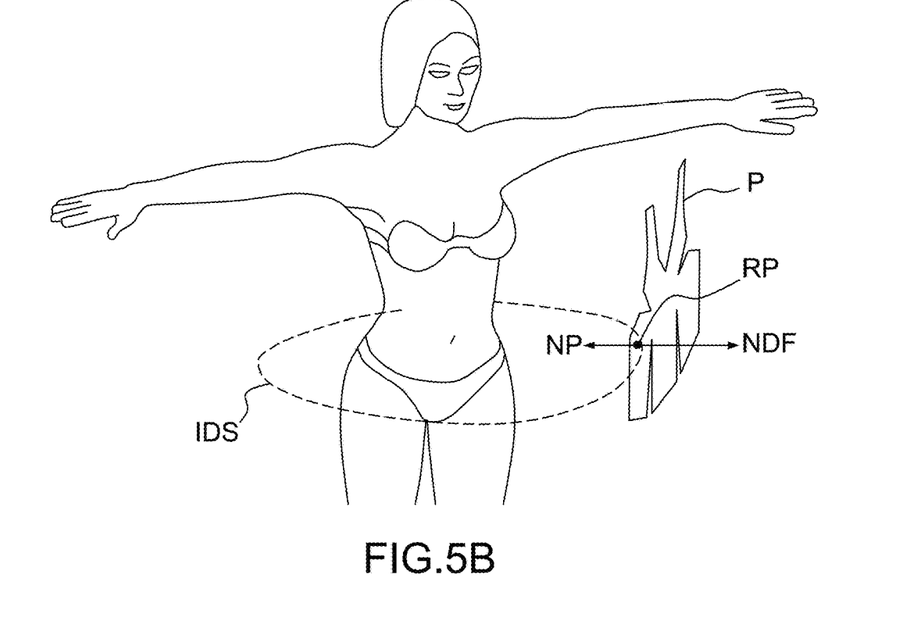
Figure 5C:
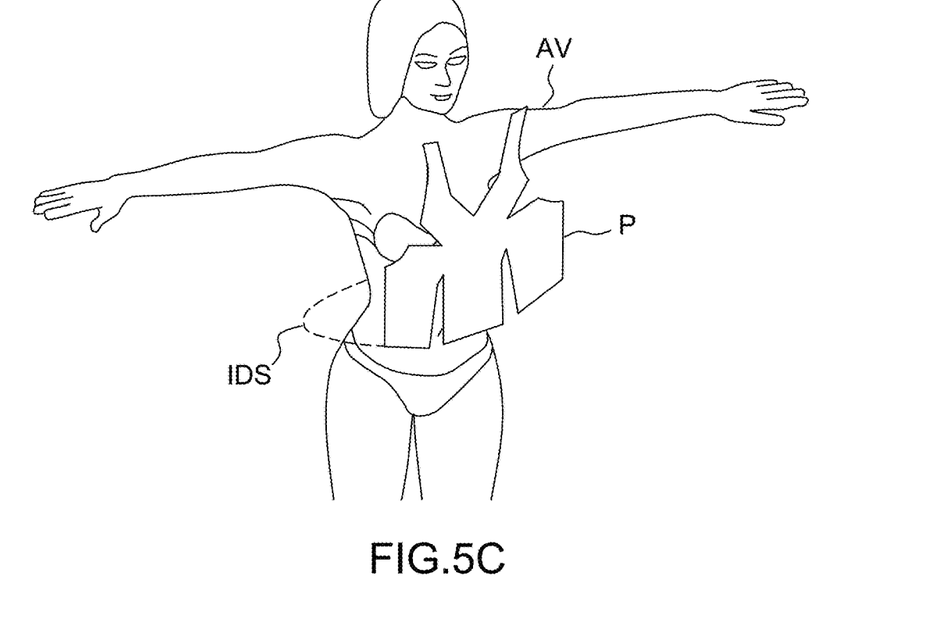
Figure 5D:
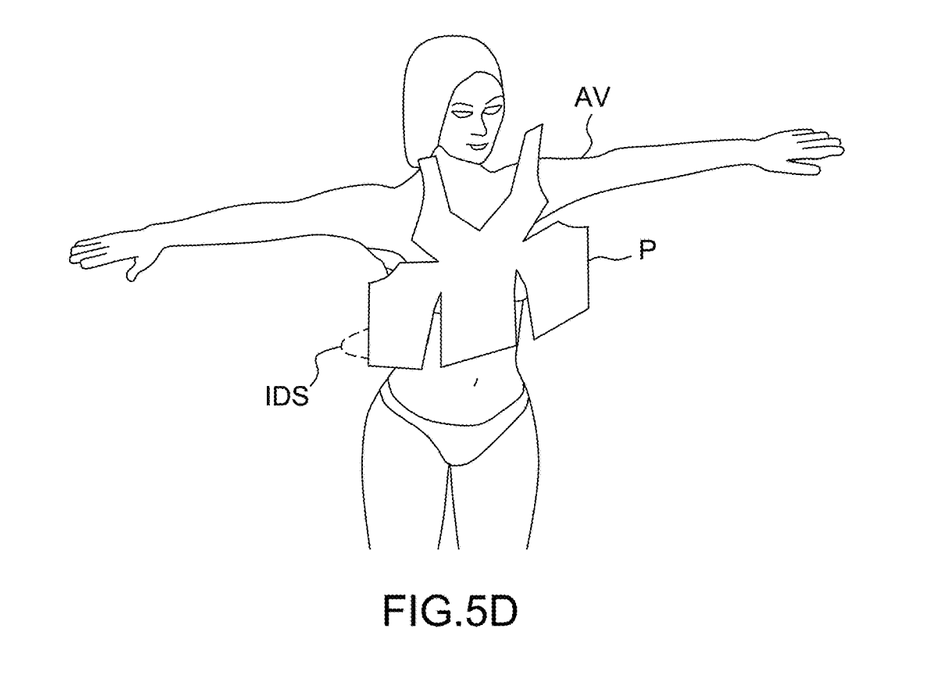
Figure 5E:
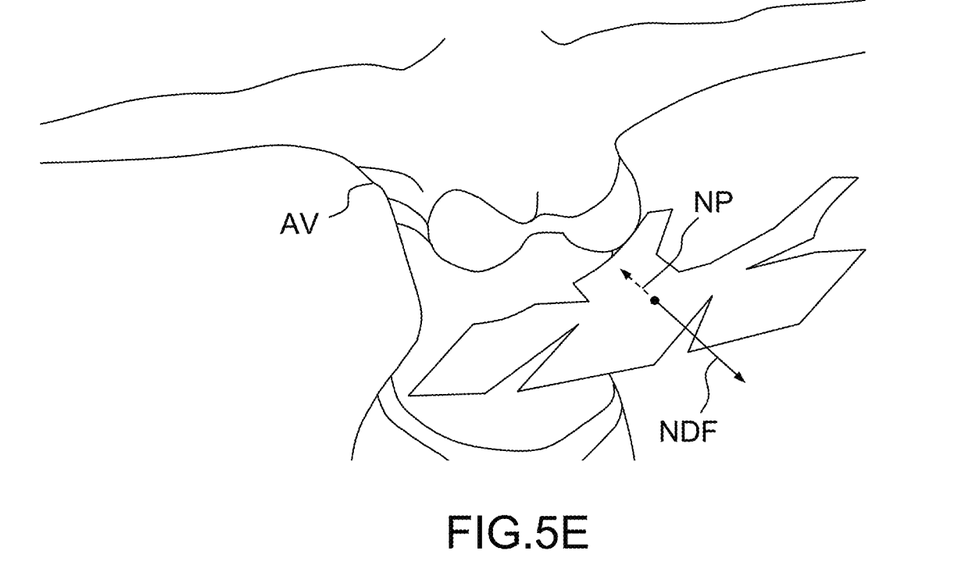
Figure 5F:
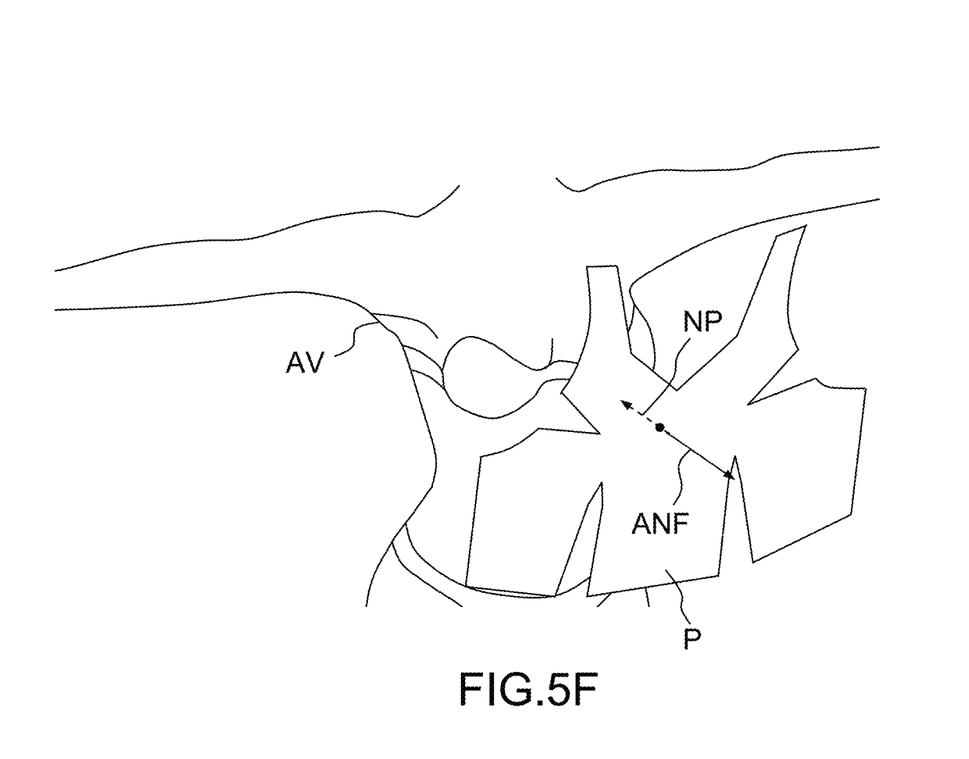

FIGS. 5A-5D show the pattern being progressively approached to the avatar and rotated to the left following iso-distance surfaces IDS. As illustrated on FIG. 5B, at each time the normal direction to the pattern NP is aligned to the normal direction NDF of the distance field at the reference point RP. FIG. 5E—to be compared to FIG. 4B—shows the unacceptable orientation that the pattern may take when it is disposed near the avatar's breast. FIG. 5F—to be compared to FIG. 4C—shows that a more acceptable orientation is obtained if an average normal direction ADF of the distance field is considered instead of NDF.

Figure 5G:
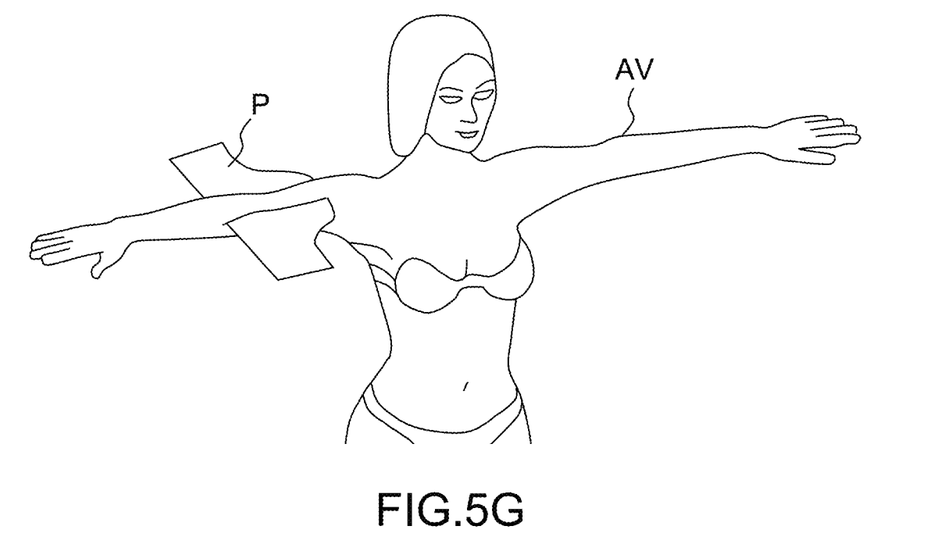
Figure 5H:
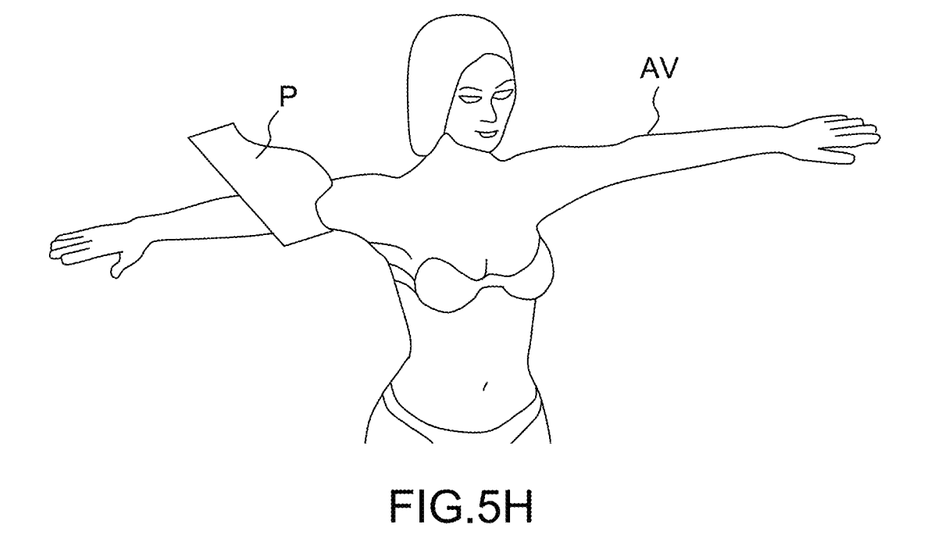
Figure 5I:
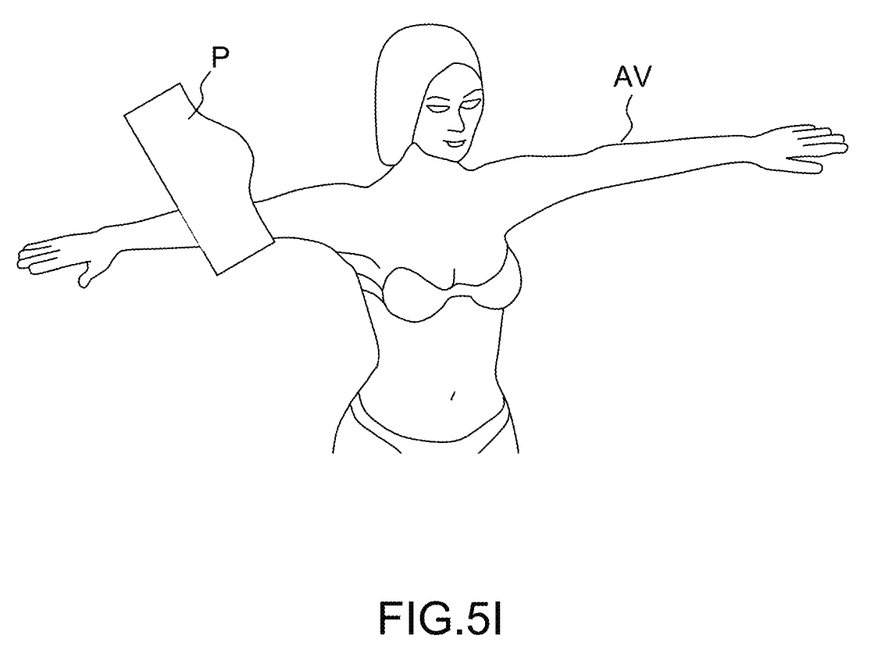

FIGS. 5G-5I show that the use of a signed distance field provides an easy and effective way to detect and avoid collisions between a pattern and the avatar. FIG. 5G shows a pattern P which has been pre-positioned in such a way that it collides with the avatar AV, i.e. it is partly inside it. As mentioned above, the distance field takes negative values inside the avatar; therefore, the collision is very simply detected, and in a fully automated way, by checking that the minimal value of the distance field over the pattern is negative. The pattern can then be easily moved outside the avatar (FIG. 5H) and, if required, rotated around it while keeping a constant distance and therefore avoiding further collisions (FIG. 5I).

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 6:
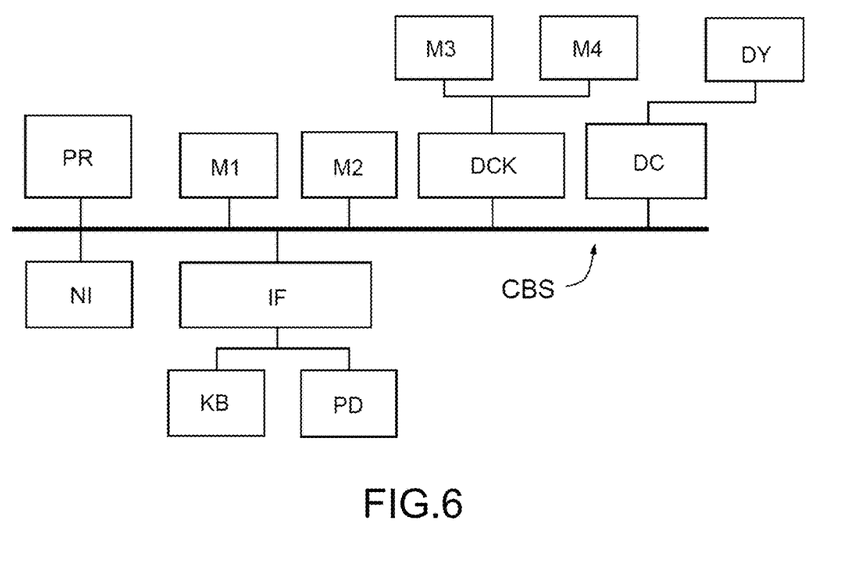
FIGS. 6 and 7 are block diagrams of respective computer systems suitable for carrying out a method according to an embodiment of the invention.

A computer—more precisely a computer aided design station—suitable for carrying out a method according to an exemplary embodiment of the present invention is described with reference to FIG. 6. In FIG. 6, the computer includes a Central Processing Unit (CPU) PR which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. An avatar database, and a pattern database—i.e. organized sets of digital models of avatars and garment patterns in a form suitable to be processed by the executable program according to the inventive method—may also be stored on one or more of memory devices M1 to M4, or remotely.

The claimed invention is not limited by the form of the computer-readable media on which the computer-readable instructions and/or the avatar and garment databases of the inventive process are stored. For example, the instructions and databases can be stored on CDs, DVDs, in FLASH memory, RAM, ROM, PROM, EPROM, EEPROM, hard disk or any other information processing device with which the computer aided design station communicates, such as a server or computer. The program and the database can be stored on a same memory device or on different memory devices.

Further, a computer program suitable for carrying out the inventive method can be provided as a utility application, background daemon, or component of an operating system, or combination thereof, executing in conjunction with CPU PR and an operating system such as Microsoft VISTA, Microsoft Windows 7, UNIX, Solaris, LINUX, Apple MAC-OS and other systems known to those skilled in the art.

CPU PR can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 6 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface.

Disk controller DKC connects HDD M3 and DVD/CD M4 with communication bus CBS, which can be an ISA, EISA, VESA, PCI, or similar, for interconnecting all of the components of the computer aided design station.

A description of the general features and functionality of the display, keyboard, pointing device, as well as the display controller, disk controller, network interface and I/O interface is omitted herein for brevity as these features are known.

Figure 7:
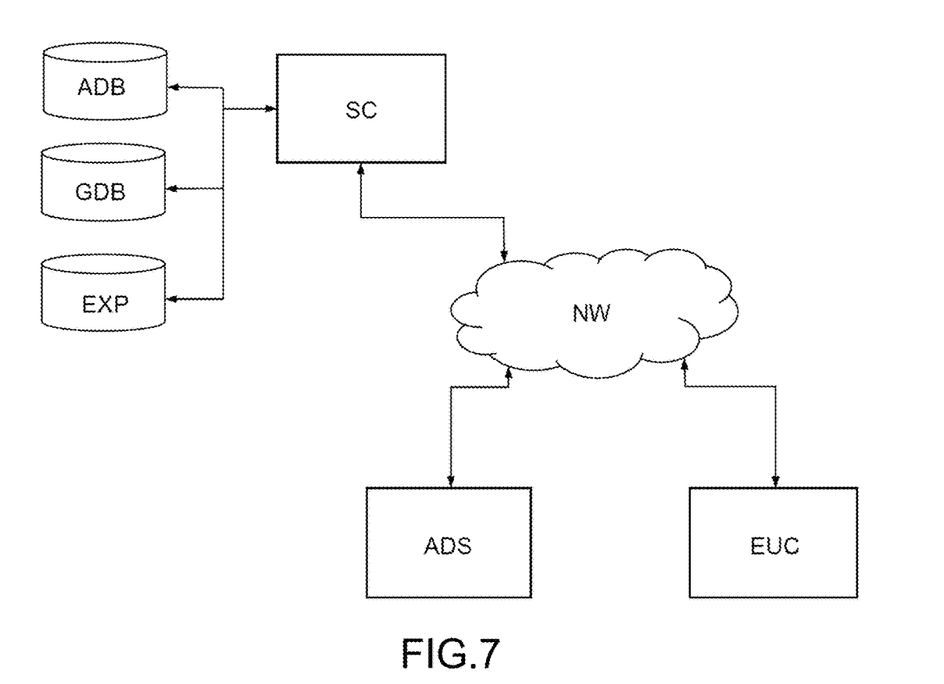

FIG. 7 is a block diagram of a computer system suitable for carrying out a method according to a different exemplary embodiment of the present invention.

In FIG. 7, the executable program EXP, the avatar database ADB and the garment pattern database GDB are stored on memory devices connected to a server SC. The memory devices and the overall architecture of the server may be the same as discussed above with reference to FIG. 6, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 6, except that the memory devices of the administrator system and the end user computer do not store the executable program EXP, the avatar database ADB and the garment pattern database GDB. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses the avatar and garment pattern databases on the server via the network NW. This allows an end user to select an avatar and a set of patterns forming a garment adapted to said avatar, and to pre-position them in a 3D virtual space. The server performs the processing as described above with reference to FIGS. 2A to 5I, taking into account inputs from the user. It then transmits the avatar and the patterns positioned around it to the end user computer, again using the network NW.

Although only one administrator system ADS and one end user system EUX are shown, the system can support any number of administrator systems and/or end user systems without limitation. Similarly, multiple servers, avatar databases and garment pattern databases can also be implemented in the system without departing from the scope of the present invention Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present invention.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

[1] Arnulph Fuhrmann, Clemens Groβ, Volker Luckas, Andreas Weber "Interaction-free dressing of virtual humans", Computers & Graphics Vol. 27, pp. 71-82 (2003).
[2] Hyewon Seo and Nadia Magnenat-Thalman "An automatic modeling of human bodies from sizing parameters", Proceedings of the 2003 Symposium on Interactive 3D graphics.
[3] Brett Allen, Brian Curless, B. Buxton and P. Treleaven "The space of human body shapes: reconstruction and parametrization from range scans" Transaction on graphics ACM, Siggraph 2003.
[4] Clemens Groβ, Arnulph Fuhrmann and Volker Luckas "Automatic pre-positioning of virtual clothing" Proceedings of the 19 th spring conference on Computer graphics. ACM, 2003.
[5] Le Thanh, Tung, and André Gagalowicz. "Virtual garment pre-positioning." Computer Analysis of Images and Patterns. Springer Berlin Heidelberg, 2005.

What is claimed is:

1. A computer-implemented method for designing a virtual garment or upholstery in a three-dimensional scene comprising the steps of:
 a) providing at least one pattern of said virtual garment or upholstery in the three-dimensional scene;
 b) providing a three-dimensional avatar in the three-dimensional scene;
 c) computing a distance field from a surface of the avatar, wherein each point of a 3D virtual space containing the avatar is attributed a numerical value expressing a distance from the nearest point of the surface of the avatar to each point of the 3D virtual space;
 d) positioning the at least one pattern relative to the avatar by keeping a fixed orientation with respect to said distance field, by:
  d1) pre-positioning the pattern relative to the avatar using a positioning device; and
  d3) automatically rotating the pattern so that a normal direction, or average normal direction, to said pattern is aligned to a normal direction, or average normal direction, to an iso-distance surface of said distance field; and
 e) assembling the positioned pattern or patterns around the avatar to form said virtual garment or upholstery, and draping it onto the avatar.

2. The computer-implemented method of claim 1 wherein said step d) also comprises the sub-step of:
 d2) adjusting a distance of the pattern from the avatar using said or a different positioning device.

3. The computer-implemented method of claim 2 wherein the distance of the pattern from the avatar is the distance between a reference point of the pattern and a nearest point of the avatar.

4. The computer-implemented method of claim 2 wherein the distance of the pattern from the avatar is the minimal distance between a point of the pattern and a point of the avatar.

5. The computer-implemented method of claim 1 wherein said step d) also comprises the sub-step of:
- d4) moving the pattern on the iso-distance surface of said distance field using said or a different positioning device while keeping the normal direction, or average normal direction, to said pattern aligned to the normal direction, or average normal direction, to said distance field.

6. The computer-implemented method of claim 1 wherein the normal direction to the iso-distance surface is its normal direction at a point of said iso-distance surface which is nearest to the pattern or to a reference point thereof.

7. The computer-implemented method of claim 1 wherein the average normal direction to the iso-distance surface is computed by averaging normal directions to different points of a reference area of the iso-distance surface.

8. The computer-implemented method of claim 1 wherein the positioning device is chosen among: a mouse, a keyboard, a touch screen and a trackball.

9. A computer program product comprising:
a non-transitory computer-readable data-storage medium storing computer-executable instructions to cause a computer system to design a virtual garment or upholstery in a three-dimensional scene;
the instructions configuring the computer system to:
- a) provide at least one pattern of said virtual garment or upholstery in the three-dimensional scene;
- b) provide a three-dimensional avatar in the three-dimensional scene;
- c) compute a distance field from a surface of the avatar, wherein each point of a 3D virtual space containing the avatar is attributed a numerical value expressing a distance from the nearest point of the surface of the avatar to each point of the 3D virtual space;
- d) position the at least one pattern relative to the avatar by keeping a fixed orientation with respect to said distance field by:
  - d1) pre-positioning the pattern relative to the avatar using a positioning device; and
  - d3) automatically rotating the pattern so that a normal direction, or average normal direction, to said pattern is aligned to a normal direction, or average normal direction, to an iso-distance surface of said distance field; and
- e) assemble the positioned pattern or patterns around the avatar to form said virtual garment or upholstery, and draping it onto the avatar.

10. A non-volatile computer-readable data-storage medium comprising:
a memory containing computer-executable instructions causing a computer system to design a virtual garment or upholstery in a three-dimensional scene by:
- a) providing at least one pattern of said virtual garment or upholstery in the three-dimensional scene;
- b) providing a three-dimensional avatar in the three-dimensional scene;
- c) computing a distance field from a surface of the avatar, wherein each point of a 3D virtual space containing the avatar is attributed a numerical value expressing a distance from the nearest point of the surface of the avatar to each point of the 3D virtual space;
- d) positioning the at least one pattern relative to the avatar by keeping a fixed orientation with respect to said distance field by:
  - d1) pre-positioning the pattern relative to the avatar using a positioning device; and
  - d3) automatically rotating the pattern so that a normal direction, or average normal direction, to said pattern is aligned to a normal direction, or average normal direction, to an iso-distance surface of said distance field; and
- e) assembling the positioned pattern or patterns around the avatar to form said virtual garment or upholstery, and draping it onto the avatar.

11. A Computer Aided Design system comprising:
a processor coupled to a memory and a graphical user interface;
the memory storing computer-executable instructions that cause the Computer Aided Design system to design a virtual garment or upholstery in a three-dimensional scene by:
- a) providing at least one pattern of said virtual garment or upholstery in the three-dimensional scene;
- b) providing a three-dimensional avatar in the three-dimensional scene;
- c) computing a distance field from a surface of the avatar, wherein each point of a 3D virtual space containing the avatar is attributed a numerical value expressing a distance from the nearest point of the surface of the avatar to each point of the 3D virtual space;
- d) positioning the at least one pattern relative to the avatar by keeping a fixed orientation with respect to said distance field by:
  - d1) pre-positioning the pattern relative to the avatar using a positioning device; and
  - d3) automatically rotating the pattern so that a normal direction, or average normal direction, to said pattern is aligned to a normal direction, or average normal direction, to an iso-distance surface of said distance field; and
- e) assembling the positioned pattern or patterns around the avatar to form said virtual garment or upholstery, and draping it onto the avatar.

12. A method of manufacturing a garment or upholstery having a plurality of two-dimensional patterns assembled by their edges, the method comprising:
a step of designing said garment or upholstery, including a sub-step of defining seams between said patterns by:
- a) providing at least one pattern of said garment or upholstery in a three-dimensional scene;
- b) providing a three-dimensional avatar in the three-dimensional scene;
- c) computing a distance field from a surface of the avatar, wherein each point of a 3D virtual space containing the avatar is attributed a numerical value expressing a distance from the nearest point of the surface of the avatar to each point of the 3D virtual space;
- d) positioning the at least one pattern relative to the avatar by keeping a fixed orientation with respect to said distance field by:
  - d1) pre-positioning the pattern relative to the avatar using a positioning device; and
  - d3) automatically rotating the pattern so that a normal direction, or average normal direction, to said pattern is aligned to a normal direction, or average normal direction, to an iso-distance surface of said distance field; and e) assembling the positioned pattern or patterns around the avatar to form said garment or upholstery, and draping it onto the avatar; and a step of physically manufacturing said garment or upholstery, including assembling said patterns by realizing said seams.

13. A garment or upholstery obtained by the method of manufacturing of claim 12.

\* \* \* \* \*